United States Patent
Hu

[19]

[11] Patent Number: 6,115,329
[45] Date of Patent: Sep. 5, 2000

[54] AIR BEARING SURFACE DESIGN FOR CONSTANT FLY HEIGHT PROFILE

[75] Inventor: Yong Hu, Fremont, Calif.

[73] Assignee: Seagate Technology Inc., Scotts Valley, Calif.

[21] Appl. No.: 09/056,057

[22] Filed: Apr. 6, 1998

[51] Int. Cl.$^7$ ................................. G11B 21/21; G11B 5/60
[52] U.S. Cl. ............................................ 369/13; 360/237
[58] Field of Search ................................. 360/103, 235.4, 360/236.4, 236.6, 237; 369/13

[56] References Cited

U.S. PATENT DOCUMENTS

| | | | |
|---|---|---|---|
| 4,633,450 | 12/1986 | Gueugnon | 369/13 |
| 4,893,207 | 1/1989 | Maury et al. | 360/114 |
| 5,677,812 | 10/1997 | Cha | 360/103 |
| 5,748,408 | 5/1998 | Barrois et al. | 360/103 |
| 5,754,367 | 5/1998 | Chang et al. | 360/103 |
| 5,889,637 | 3/1999 | Chang et al. | 360/103 |
| 5,894,379 | 4/1999 | Koishi et al. | 360/103 |

FOREIGN PATENT DOCUMENTS

| | | |
|---|---|---|
| 0 518 566 | 12/1992 | European Pat. Off. . |
| 0 652 552 | 5/1995 | European Pat. Off. . |
| 8-273183 | 10/1996 | Japan . |

*Primary Examiner*—Robert S. Tupper
*Attorney, Agent, or Firm*—Flehr Hohbach Test Albritton & Herbert LLP

[57] ABSTRACT

The air bearing design consists of four rectangular pads. Each pad features an open rectangular pocket located at the corner of the leading and inner (closer to the disc ID) edges. The pocket opens towards the slider's leading and inner edges. The increase in linear velocity from ID to OD dictates that the slider flies lower at ID than OD. The introduction of the open pocket can effectively offset the difference due to the linear velocity. As we move from ID to OD, the steps that the skewed airflow encounters change from the forward to reverse. Consequently, the lifting force generated by the air compression at the forward steps decrease, while the suction force produced by the air expansion at the reverse step increases, reaching a maximum at OD. Both of them offset the effect of the linear velocity, yielding a constant fly height profile from ID to OD. In addition, the open pockets toward the inner edge generate more air bearing compression for the incoming side flow, improving the ramp-loading dynamic stability under large roll static attitude. The open pocket can be either a step or ramp surface, and the number of pads can be varied. The air bearing design is scalable to achieve different fly heights.

17 Claims, 16 Drawing Sheets

3D Air Bearing Surface

Fly Height Profiles

Air Flow Field @MD

Air Flow Field @OD

AIR BEARING SURFACE DESIGN FOR CONSTANT FLY HEIGHT PROFILE

FIELD OF THE INVENTION

The present invention relates to disc drive storage systems, and more particularly to an improved air bearing slider for use with a rotary actuator in a disc drive.

BACKGROUND OF THE INVENTION

Information storage technology and the storage capacity available therefrom has been historically limited by a number of factors. A typical prior art Winchester magnetic storage system includes a magnetic head that has a slider element and a magnetic read/write element and is coupled to a rotary actuator magnet and coil assembly by a suspension actuator arm so as to be positioned over the surface of a spinning magnetic disc. In operation, lift forces are generated by aerodynamic interaction between the magnetic head and the spinning magnetic disc. The lift forces are opposed by spring forces applied by the suspension so that a predetermined flying height is hopefully maintained over a full radial stroke of the radial actuator assembly above the surface of the spinning magnetic disc. Such conventional magnetic heads are constrained by the theoretical limit on the ability to closely pack adjacent magnetic bits on the disc surface and still accurately recover and read each bit of information.

To address this problem, much research is being done in the development of magneto-optical (MO) storage technology which provides a higher a real density. During conventional writing of information in MO disc drives, an incident laser beam heats a selected spot of interest on the MO disc to approximately the Curie point. A time varying vertical bias magnetic field is used to define a pattern of "up" or "down" magnetic domains in a recording layer. Subsequently, as the selected spot of interest cools, information is recorded on the MO disc. The size of the magnetic field that is generated provides a lower limit on a maximum data density that may be recorded on the MO disc. Information access in the MO storage system in turn is limited by the size of the optical spot to which an incident laser beam may be focused on the disc surface. Magneto-optical information access requires the use of polarized laser light for reading and writing information on an MO disc. To read information, MO technology makes use of a magneto-optical effect (kerr effect). To detect a modulation of polarization rotation imposed on the linearly polarized incident laser beam by the recorded domain marks in the recording layer. The polarization rotation (representing the information stored at recorded marks or in the edges of the recorded marks) is embodied in a reflection of the linearly polarized laser beam and is converted by optics and electronics for readout.

It is apparent that an important factor in the ability to accurately read and write information from an MO disc, as well as to rapidly access different storage tracks on the MO disc is the design of the flying head, which carries the various components required for accessing magneto-optical information. The need to carry an optical assembly and a magnetic coil on the flying head has made its physical size and mass rather bulky. Therefore, it is somewhat difficult to provide a head which flies at a constant height over the surface of the disc from the outer diameter (OD) to the inner diameter (ID). This is because the slider, which is the primary part of the flying head which controls the flying characteristics, typically includes a pair of side rails which are positioned along its side edges and are disposed about a recessed area. These side rails form a pair of air bearing surfaces. As the disc rotates, the disc drags air under the slider and along the air bearing surfaces in a direction approximately parallel to the tangential velocity of the disc. As the air passes beneath the side rails, the compression by the air bearing surfaces causes air pressure between the disc and the air bearing surfaces to increase, which creates a hydrodynamic lifting force that causes the slider to lift and fly above the disc surface. Of course, since the outer radius of the disc is moving faster than the inner radius of the disc, the linear velocity of the air passing beneath the side rails changes substantially as the slider moves from the OD to the ID. Therefore, compensation must be made in the slider air bearing surface design for this change. It has become known in this technology to define a recess or cavity between the side rails. The air passing beneath the slider expands in the cavity, resulting in a decrease in pressure. The pressure in the cavity may become negative (or subambient) in which case the integral of the pressure over the cavity area provides a self loading force on the slider which forces the slider toward the disc surface. This self loading force or suction is a function of the shape and size of the cavity and is intended to counteract the hydrodynamic lifting force developed along the side rails. The interaction between the positive and negative forces on the slider is intended to reduce the flying height sensitivity with respect to disc velocity, and increase air bearing stiffness. For example, the magnitude of the positive pressure developed along the side rail increases with the sliding velocity. However, the magnitude of the self loading force or suction toward the disc surface also increases with sliding velocity, preventing the slider being forced unduly away from the disc.

A related problem is presented by the skew angle of the slider relative to the direction of the air flow. As the disc rotates, it generates wind or air flow, which is approximately parallel to the discs' tangential velocity. The wind in FIG. 1 is represented by arrow 16 and the discs' tangential velocity by an arrow 22. It is apparent that as the slider is moved from the ID to the OD along an arc 18, that the skew angle φ between the longitudinal axis 20 of the slider and the direction of the air flow will change. In a magneto-optical drive, because of the optics which are being supported by the slider, it is desirable to maintain the skew angle symmetrical about the center track of the disc surface. It has been common in the prior art to use a non-symmetrical skew angle to compensate at least in part for the change in wind velocity between the inner and outer diameter. However, that approach is less desirable, and this slider design is intended to achieve a constant fly height across the disc from ID to OD with a symmetrical skew angle.

SUMMARY OF THE INVENTION

Therefore, a basic object of the invention is to provide an air bearing slider which provides improved access to the data stored in a disc storage system.

A related objective of the invention is to provide an air bearing slider which is especially useful in a magneto-optical storage system and which gives a constant fly height across the surface of the disc from inner to outer diameter.

Another objective of the invention is to provide an air bearing slider which is easy to manufacture and is easily scaled for different sizes of sliders.

Yet another objective of the invention is to provide an air bearing slider design which is useful even with a symmetrical skew angle for the slider relative to the disc surface.

These and other objectives for the air bearing slider design are achieved by utilizing a slider which incorporates one or more rectangular pads (preferably 4 arranged in a generally rectangular form) with each pad having an open rectangular pocket or cavity located at the leading and inner (closer to the disc ID) edges. The pocket opens towards the slider's leading and inner edges. As the slider is moved from the inner diameter to the outer diameter, the open pocket step on each pad that the skewed air flow encounters effectively changes from a forward step to a reverse step. Thus when the slider is near the inner diameter, a lifting force is generated through the compression of the incoming air flow by the forward step on the slider; as the slider moves to the outer diameter, the air flow now encounters a reverse step or depression, generating a suction force as the air expands within the cavity which reaches its maximum at the outer OD. By adjusting the dimension of the open pocket, both of these lifting and suction effects can be fine tuned to offset the effect of the linear velocity, yielding a constant fly height profile from ID to OD.

In addition, the open pocket toward the inner and leading edges of each pad of the slider generates more air bearing compression for the incoming direct and side flow, improving the ramp loading dynamic stability under large pitch and roll static attitude.

The open pocket can be either a step as shown in the examples of preferred embodiments below, or a ramp surface which can be tailored to meet the need for lifting and suction forces which are a function of the size and weight of the slider as well as the speed of the disc and the number of pads utilized. The air bearing design is also scalable to achieve different fly heights.

Other features and advantages of the present invention will be better understood by reference to the following figures and the detailed description of an exemplary embodiment given below in conjunction with these figures.

DETAILED DESCRIPTION OF A PREFERRED EMBODIMENT

Figure 2:
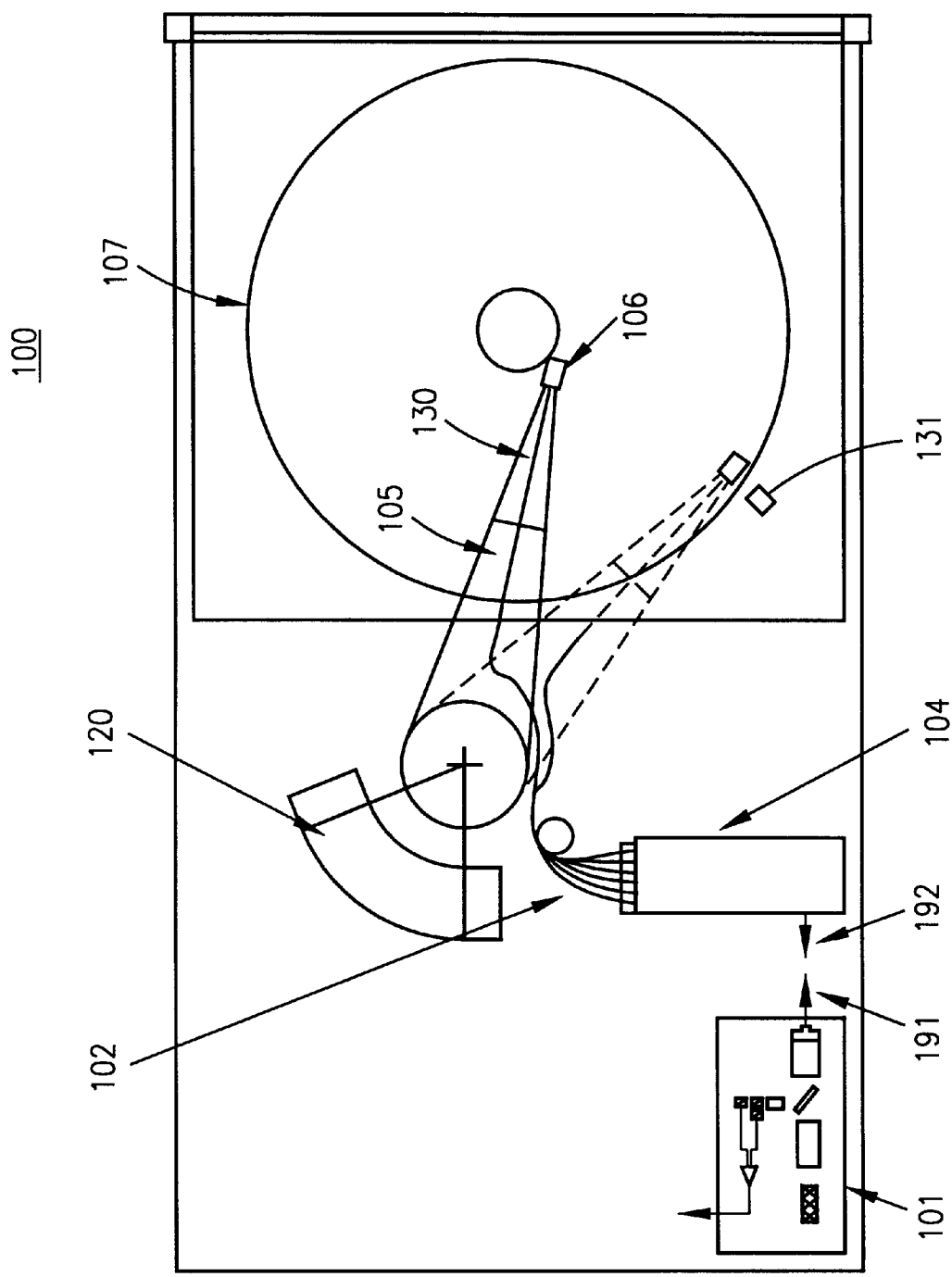
FIG. 2 is a plan view of a magneto-optical data storage disc system in which the present invention is useful.

Referring now in detail to the drawings, wherein similar parts of the invention are identified by like reference numerals, there is seen in FIG. 2 a plan view showing a typical magneto-optical data storage and retrieval system in which the present invention is useful. Of course, the slider disclosed and discussed below is not limited to use in such a magneto-optical storage system; indeed, the slider has utility in conventional magnetic disc drive storage systems, if properly scaled for the flying heights desired in such systems.

The embodiment of FIG. 2 shows a magneto-optical (MO) data storage and retrieval system 100 which includes a set of Winchester-type flying heads 106 that are adapted for use with a set of double sided MO discs 107. The set of flying heads 106 which are carried on the slider which is the subject of this invention are coupled to a rotary actuator magnet and coil assembly 120 by a suspension 130 and an actuator arm 105 to be positioned over the surfaces of the set of MO discs 107. In operation, the MO discs 107 are rotated by a spindle motor to generate aerodynamic lift forces between the sets of flying MO heads 106 and the disc surface, and to maintain the head in a flying condition above the upper and lower surfaces of the discs 107. The lift forces are opposed by equal and opposite spring forces applied by suspensions 130 as is well known in this technology. During non-operation, the MO heads are maintained statically in a storage condition away from the surfaces of the discs 107; they may rest in a landing zone at the ID of the disc surface, or on a ramp 131 which typically is at the OD of the disc surface.

System 100 further includes a laser optic assembly 101, an optical switch 104, and a set of single mode PM polarization maintaining) optical fibers 102. In the exemplary embodiment, each of the set of single mode PM optical fibers 102 are coupled through a respective one of the set of actuator arms 105 and suspension 130 to a respective one of the set of flying MO heads 106.

Figure 3:
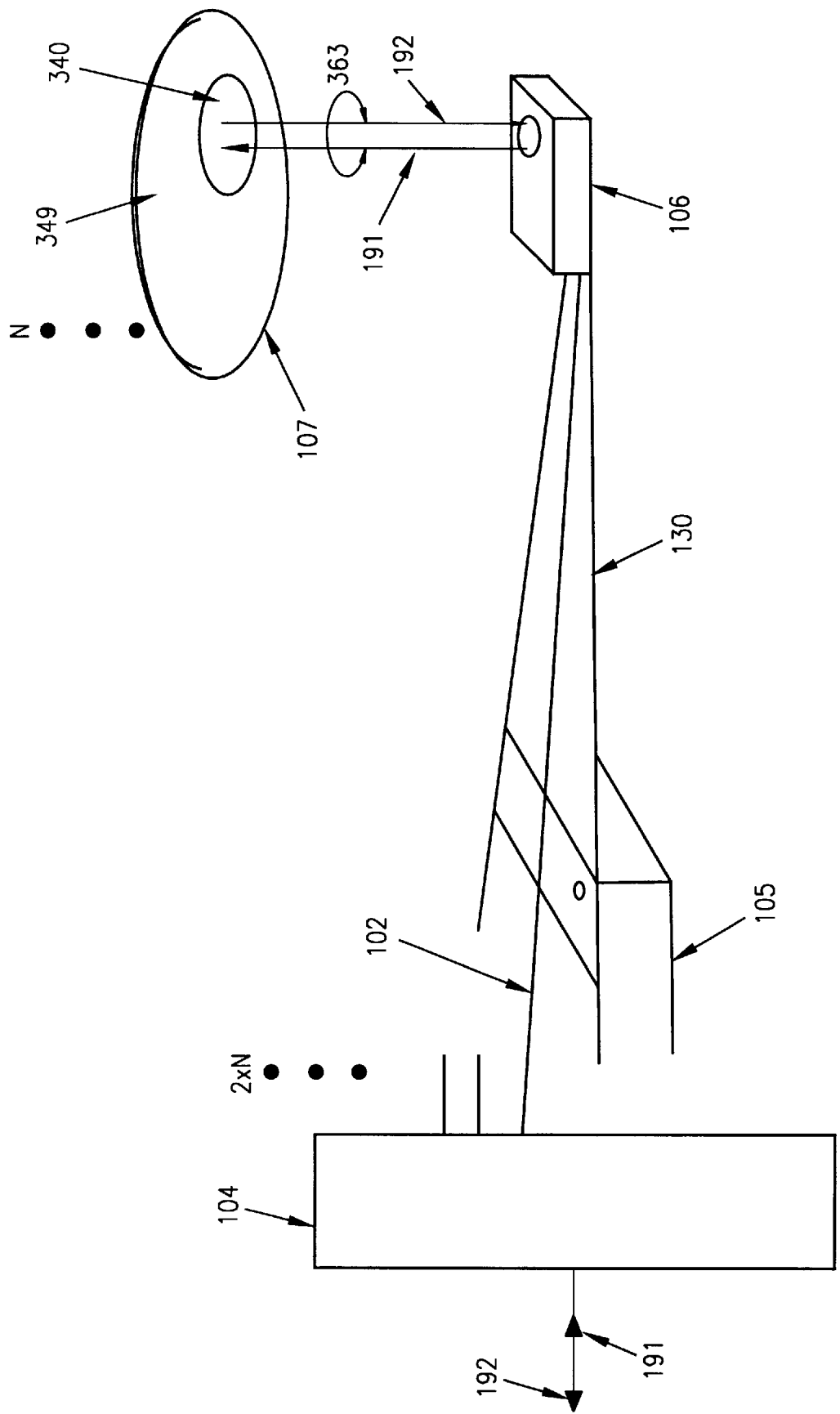
FIG. 3 is a diagram showing in simplified form a representative optical path utilizing a optical fiber which is supported on the suspension to reach one of the flying MO heads.

FIG. 3 is a diagram showing in very simplified form a representative optical path utilizing a optical fiber 102 which is supported on the suspension 130 to reach one of the flying MO heads 106. An optical switch 104 provides for directing an outgoing laser beam 191 toward a respective proximal end of the PM optical fiber 102. The outgoing laser beam 191 is directed by the optical fiber 102 to exit at a respective distal end to pass through the flying MO head 106 onto a recording storage layer of a disc 107 associated with the flying head. Other details of the reading and writing operation associated with this optical fiber and optical switch may be found in an application entitled "MAXIMUM DATA STORAGE FOR MAGNETO-OPTICAL SYSTEM", U.S. Ser. No. 08/844,208 filed Apr. 18, 1997 (Attorney Docket No. Q-108) assigned to the Assignee of the present invention and incorporated herein by reference. The above FIGS. 2 and 3 are provided to illustrate the importance of quickly moving the flying head 106 to a selected position over the surface of the associated disc 107 and maintaining that head at a stable position and at a stable height over the surface of the disc while information is written to and read from the surface of the disc. The use of this slider is clearly not limited to any single configuration of head, arm and disc.

Figure 4:
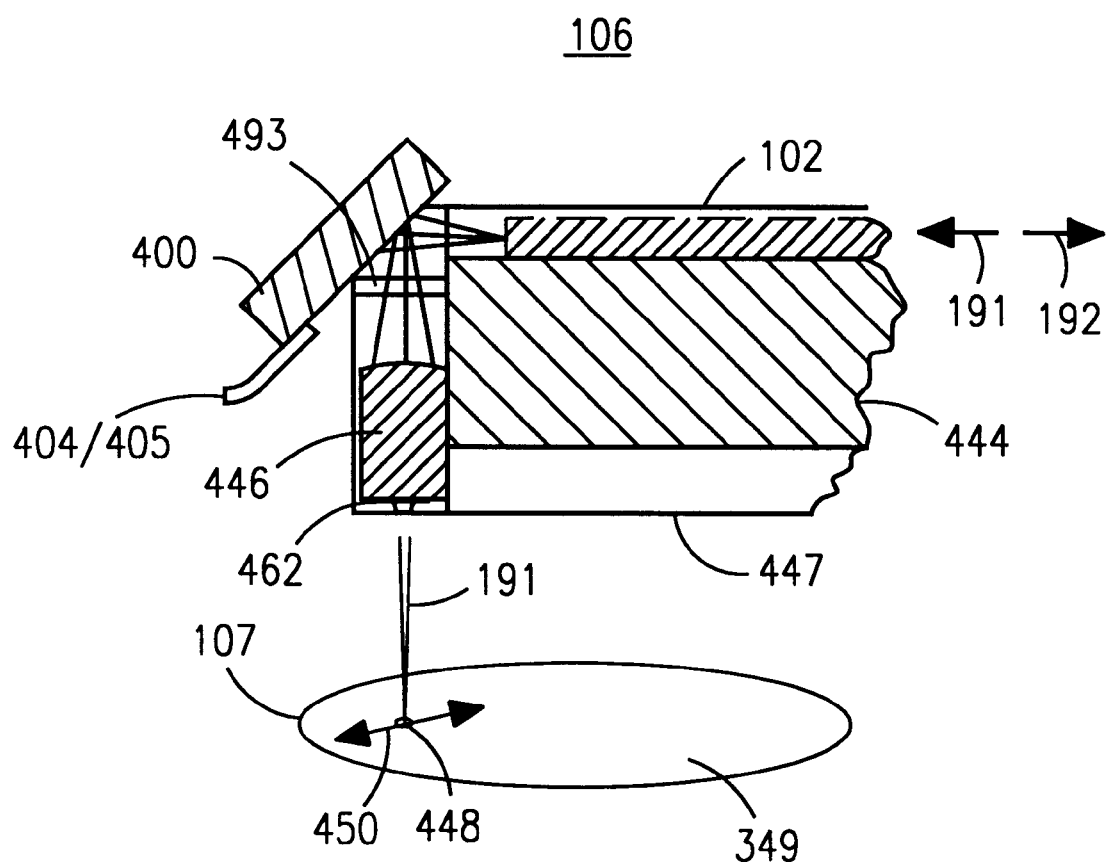
FIG. 4 is a vertical sectional view of the basic elements of a flying magneto-optical head of an MO data storage system.

FIG. 4 is a vertical sectional view of the basic elements of a flying magneto-optical head of an MO data storage system, the head being of a type generally speaking which would be supported by the slider of this invention. The flying head 106 is shown for use above a recording storage layer 349 of one MO disc 107. The MO head 106 includes in part a slider body 444 having an air bearing surface 447; a quarter waveplate 493, a reflective substrate 400 and objective optics 446 which are used to focus the light beam on the surface of the disc; and a magnetic coil 460 and a yoke 462 which are used to establish the magnetic field which is necessary for accessing data on the disc surface. The slider body 444 is dimensioned to establish the working distance between the objective optics, the optical fiber 102 and the reflective substrate 400. The reflective substrate 400 may also include a reflective surface which is aligned by electrodes 404, 405 to direct the outgoing laser beams 191 to and from the storage layer 349. It is apparent from a review of this figure that the slider must be capable of carrying a substantial amount of structure and supporting it in a stable fashion over the surface of the disc. It is for this reason that the slider body of this invention shown in the succeeding figures has been designed and adopted.

Figure 5:
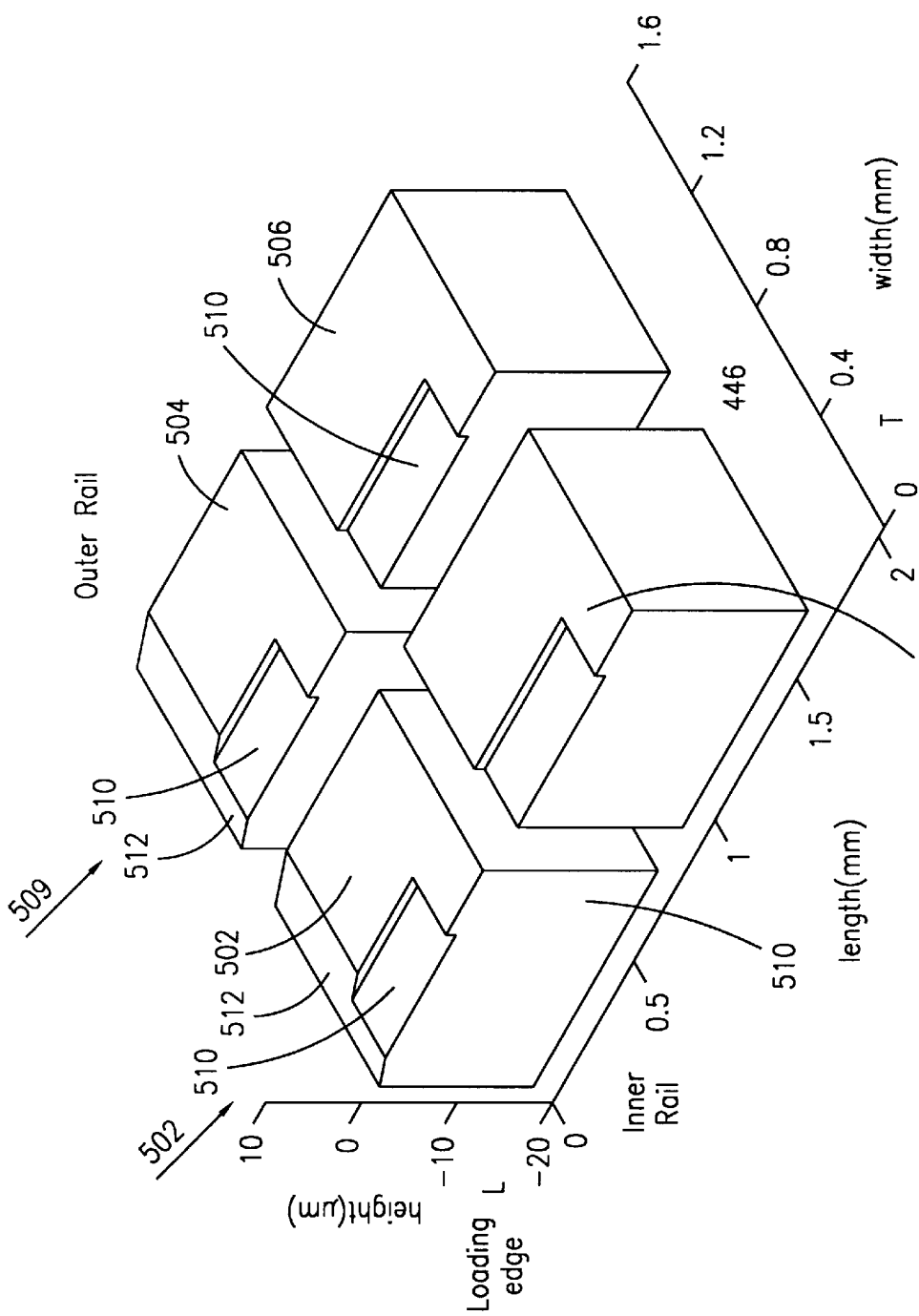
FIG. 5 is a perspective view of a slider constructed in accordance with this invention.

FIG. 5 is a perspective view of a slider constructed in accordance with this invention, with the objective of providing a flat fly height profile from inner diameter to outer diameter of the disc, as well as enhancing ramp unloading performance, especially under large pitch and roll static altitude. The optics shown and discussed with respect to FIG. 4 are supported where the reference numeral 446 can be seen on the figure. The design of FIG. 5 comprises four pads 502, 504, 506, 508. Of course, it should be understood that the design could also be a three pad, two pad or even five pad or more design, although it is believed that the four pad approach is an optimal one. The dimension in terms of length and height are shown in the scales along the sides of FIG. 5. The pads 502, 508 each have a planar surface which is the primary air flow surface and together define an inner rail 507 for the slider; pads 504, 506 similarly have air flow surfaces which cooperate to form an outer rail 509.

Figure 1:
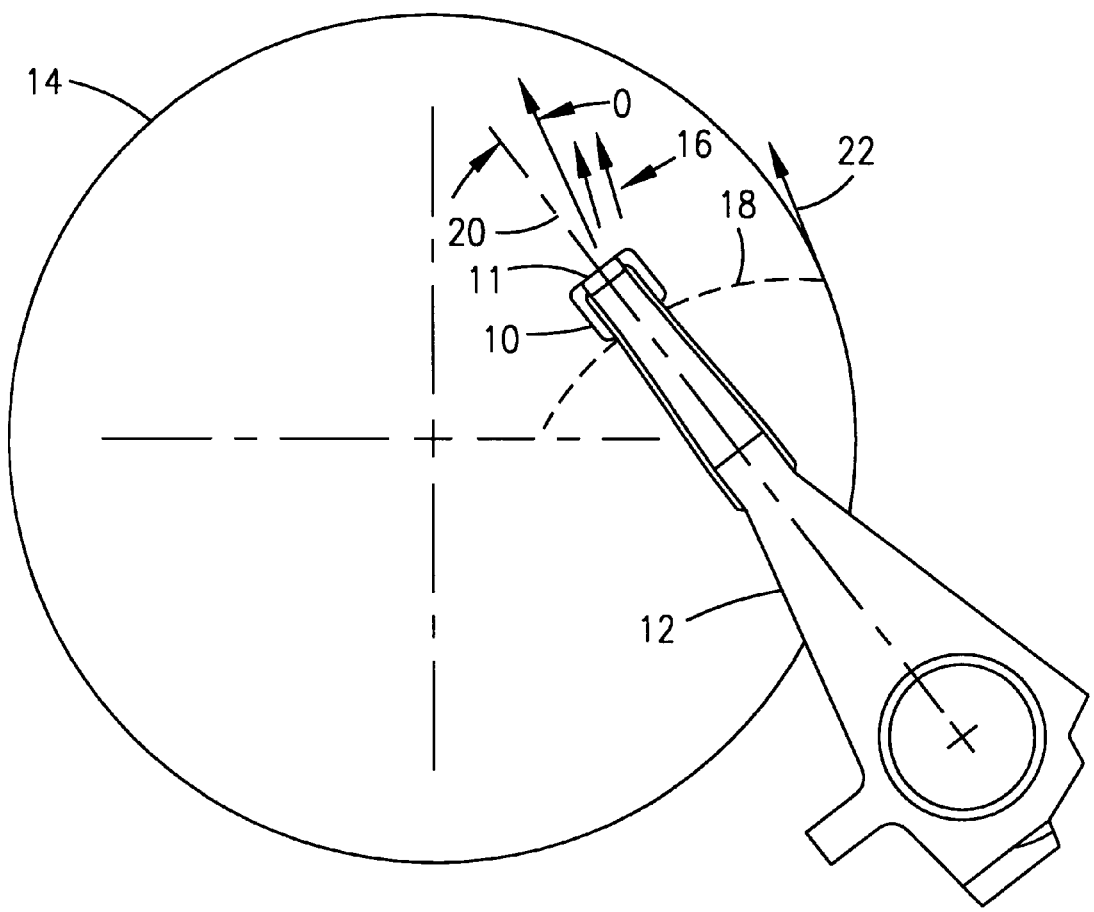
FIG. 1 is a plan view showing a typical data storage disc and actuator used to illustrate air flow and skew angle.
Figure 6:
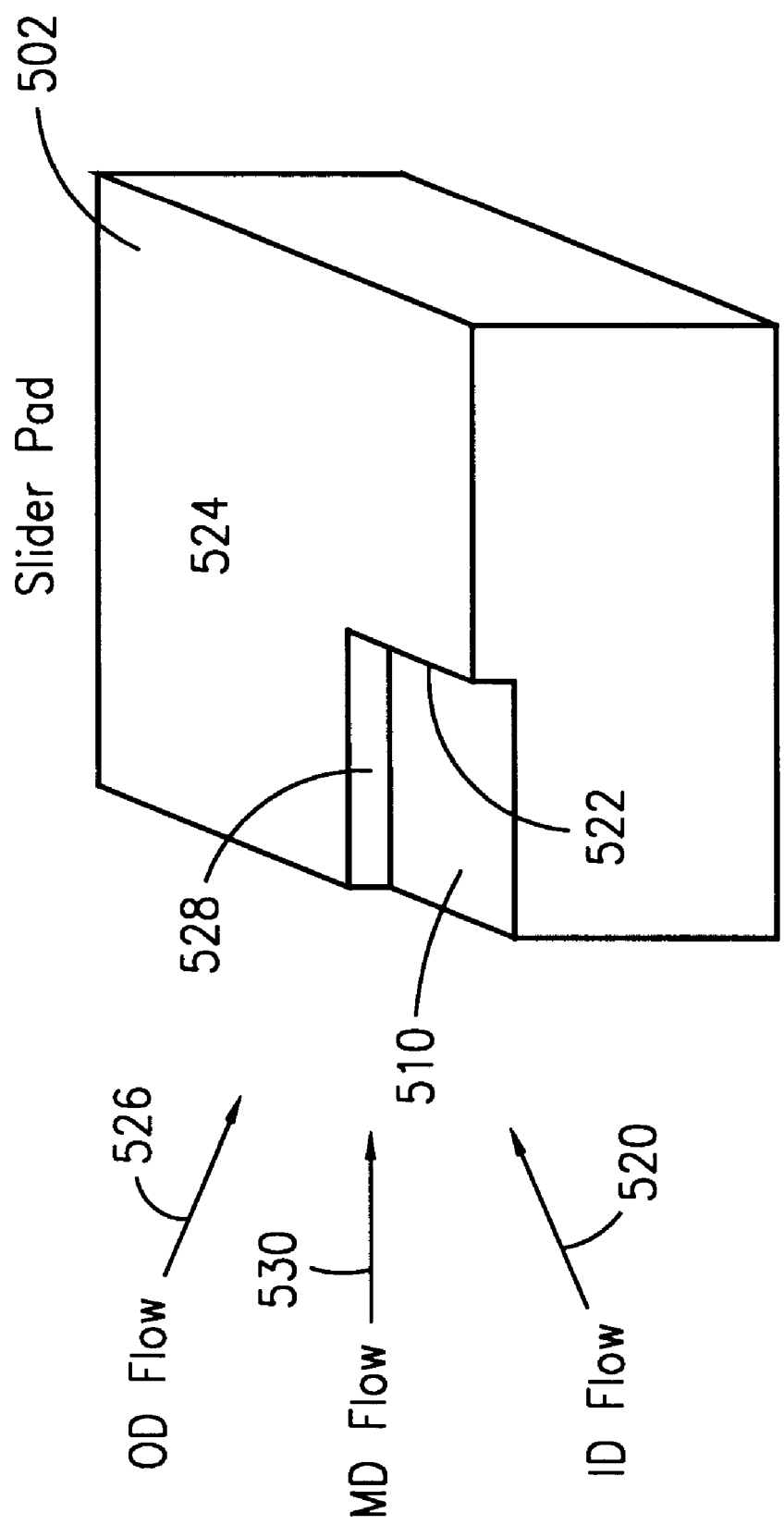
FIG. 6 shows a single exemplary slider pad with a cavity in accordance with the present invention.

Each of the pads has a pocket or cavity 510 located at the corner of the pad, which is toward the leading edge of the slider and toward the inner rail of the slider, (the inner rail being closer to the inner diameter of the disc). The pocket 510 provided on the two leading edge pads 502, 504 is adjacent and even cut into the tapered region 512. The effect of providing the pocket can be seen from the diagram of FIG. 6, which shows a single exemplary slider pad 502 with a pocket 510. At the inner diameter, the air flow is in the direction shown by the arrow 520 marked ID Flow. That this arrow correctly represents the air flow can be seen by comparing the sketch of the slider pad 502 and the air flow arrow with FIG. 1 shows a slider and arrows 16 representing air flow. For air flow in this direction, which is the lower linear velocity air flow, the air strikes the forward step defined by edges 522 and 528 and is compressed in the cavity 510. This creates a lifting force, which when added to the normal lifting force provided by the bottom surface 524 of the slider pad, achieve the optimum fly height. In contrast, when the air flow is from the direction marked by the arrow 526, OD flow, then the air spills over the edge 528 which is toward the outer railing of the depression 510. This air flow 526 over the reverse step defined at edge 528 obviously causes the air to expand within the cavity and creates a suction effect, which works against the lifting effect created by the linear velocity speed air flow at the OD of the disc passing under the air flow surfaces 524 of the slider pad. This maintains the head at the target fly height even though the air flow rate has increased. Finally, when the air flow approaches from the direction of the arrow 530 marked MD flow, then the depression is of sufficient extent in the direction of the slider's longitudinal axis that the compression and suction effects are limited.

Figure 7:
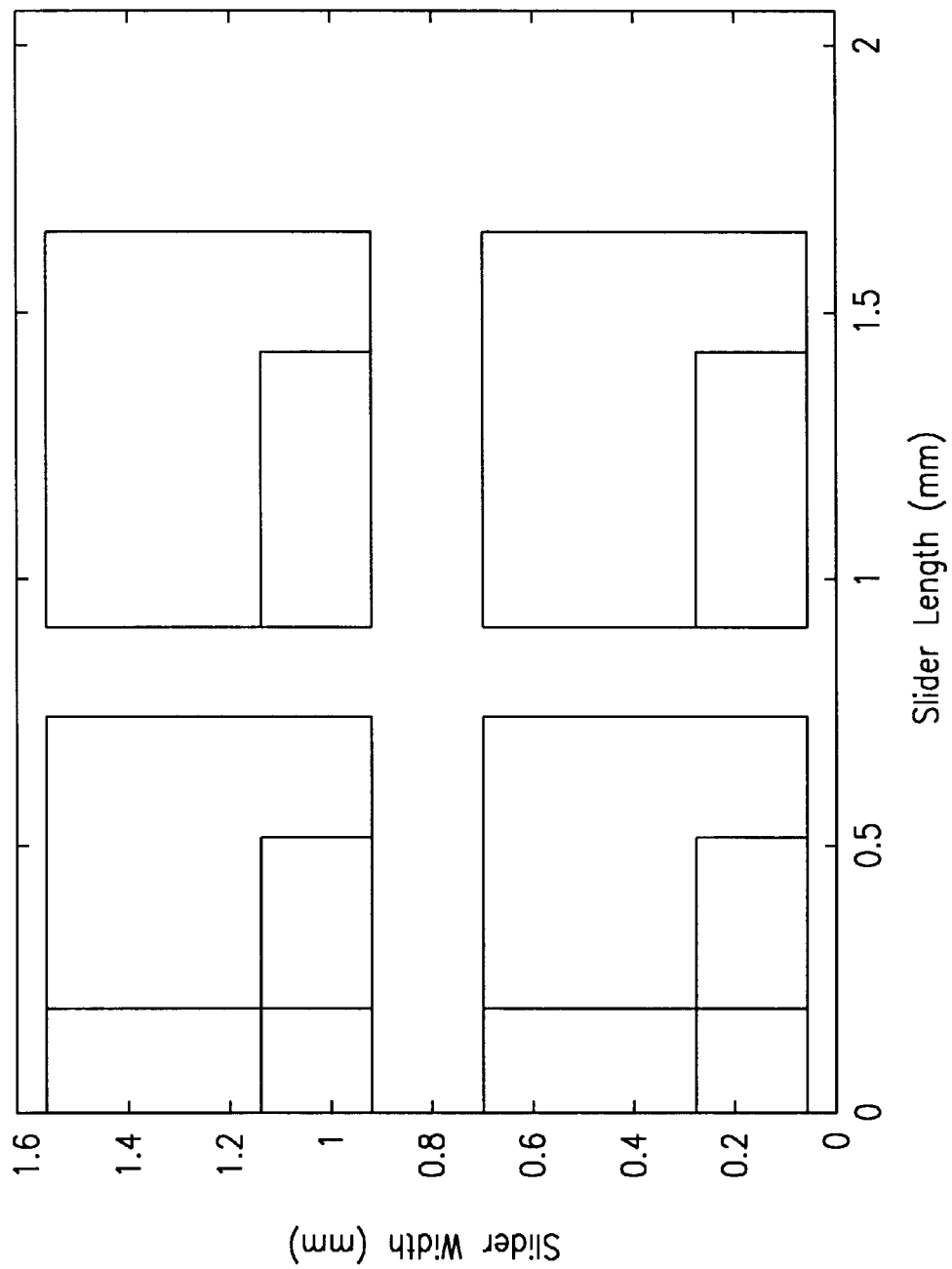
FIG. 7 shows exemplary dimensions of the pads and the steps or cavities in accordance with the present invention.

The exemplary dimensions of the pads and the steps or depressions are shown in FIG. 7, and are intended for a design which will have a flat profile at a fly height of about 20 μinch using four pads 502, 504, 506 and 508. The stable fly height is achieved by the combination of the flow across the major pad surface 524; by the compression of the air flow across the step faces 522 and 528 and by the air flow over the reverse step 528 into the depression 510 creating a suction. It is apparent from FIG. 7 that the radial width of the exemplary pad is about 0.7 mm and the cavity width is about 0.25 mm or about ⅓ of the total width; the pad length along the longitudinal axis of the slider is about 0.85 mm, with a cavity length of about 0.6 mm or ¾ of the total length. The radial gap spacing is about 0.2 mm, as is longitudinal gap spacing. The gaps are necessary to allow the air flow, especially ID flow 520, to be effective. The cavity depth, in this example, should be about 1 μm.

Figure 8:
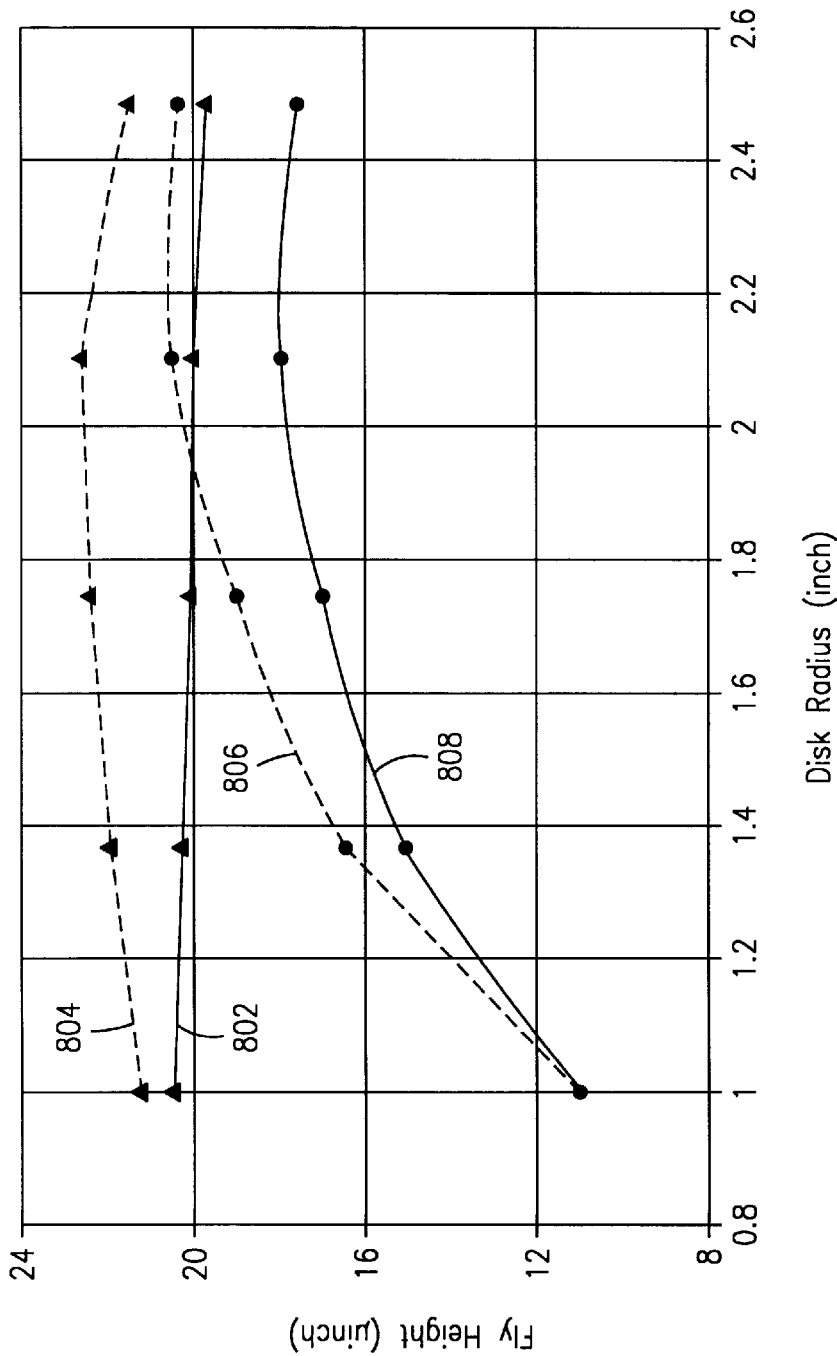
FIG. 8 illustrates the fly height profile for the design of the present invention.
Figure 9A:
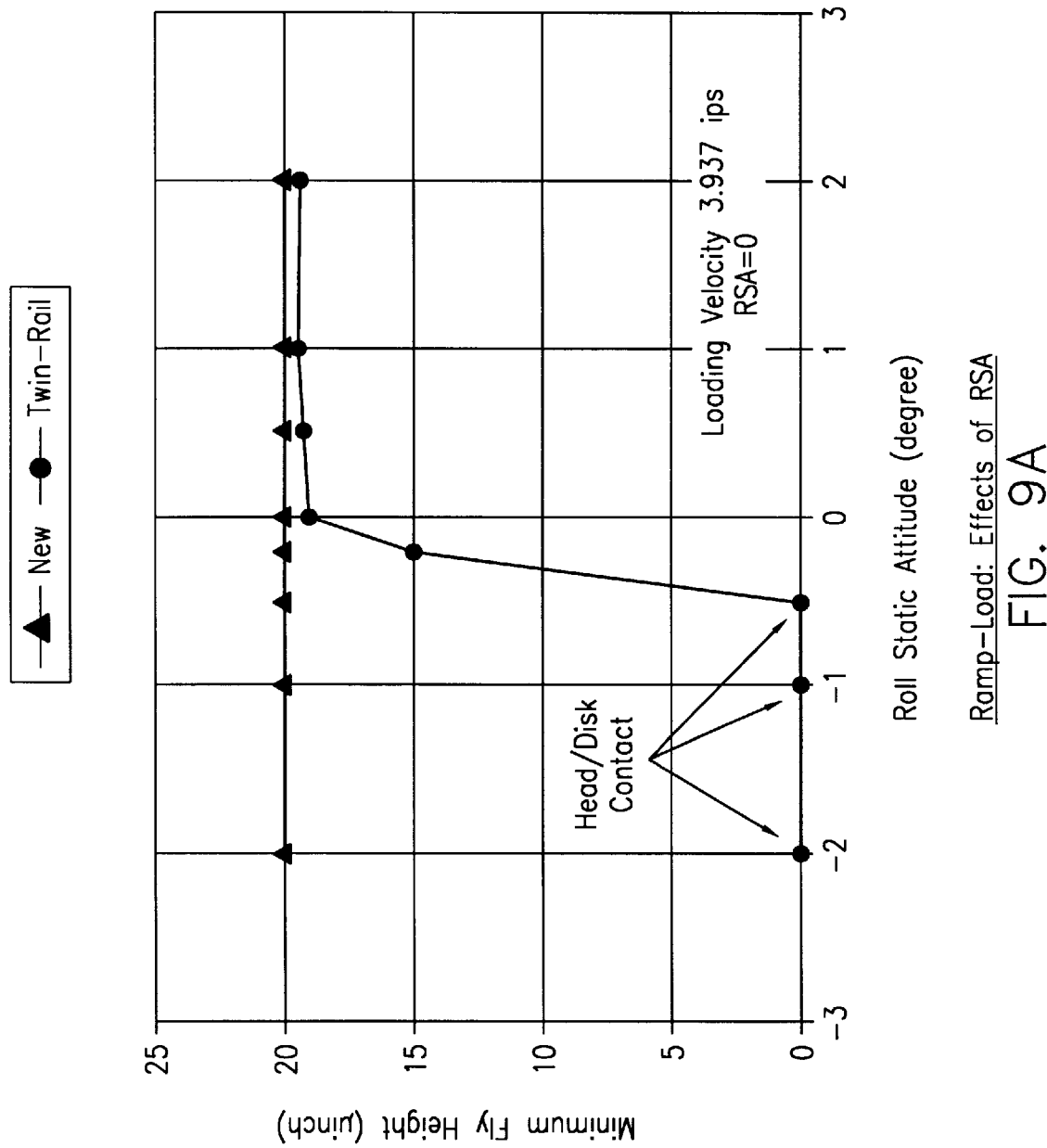
FIGS. 9A and 9B illustrate the stable ramp latch characteristics of the present invention.
Figure 9B:
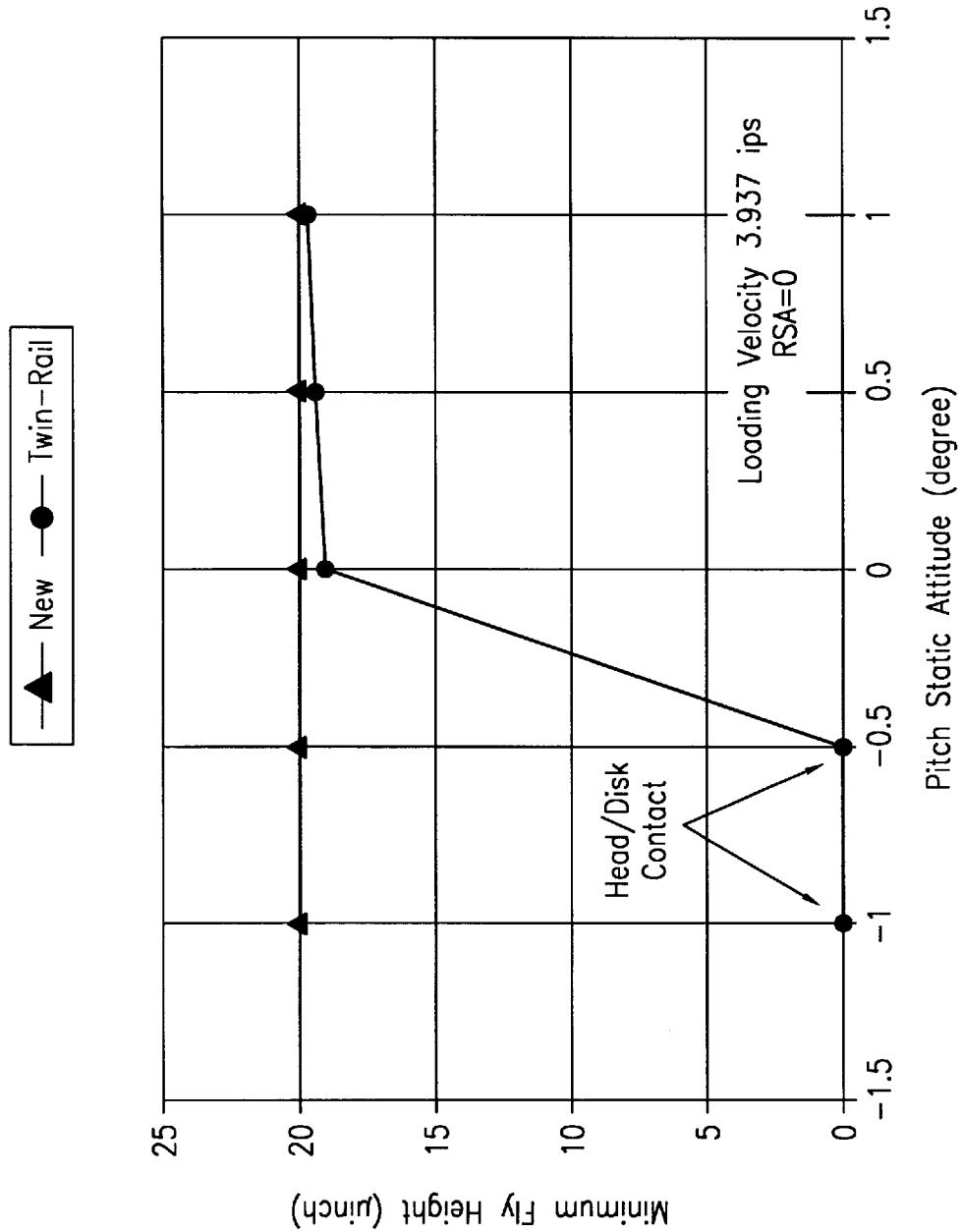

The improvement achieved by this invention is dramatically illustrated in FIG. 8, which clearly demonstrates how flat the fly profile 802, 804 is for the new design as opposed to or compared to existing twin rail designs, which are indicated by numerals 806, 808. The gap FH (fly height) is the actual height at which the optical center line flies over the surface of the disc; the min FH (minimum fly height) is the minimum head/disc spacing on the air bearing surface. FIG. 9 illustrates the pitch and roll characteristics of the new design, where pitch measures any tilting about the radially directed axis of the slider, and roll illustrates any tendency to rotate about the longitudinal axis of the slider. As the slider is loaded onto the disc off the ramp adjacent the OD of the disc, the compression provided by air flowing over the step 522 at the inboard side of the slider pad will cause the slider to immediately flatten out over the surface of the disc; therefore, FIGS. 9A and 9B demonstrate an improved stable loading performance as compared to the line 908 of the prior art design.

Figure 10A:
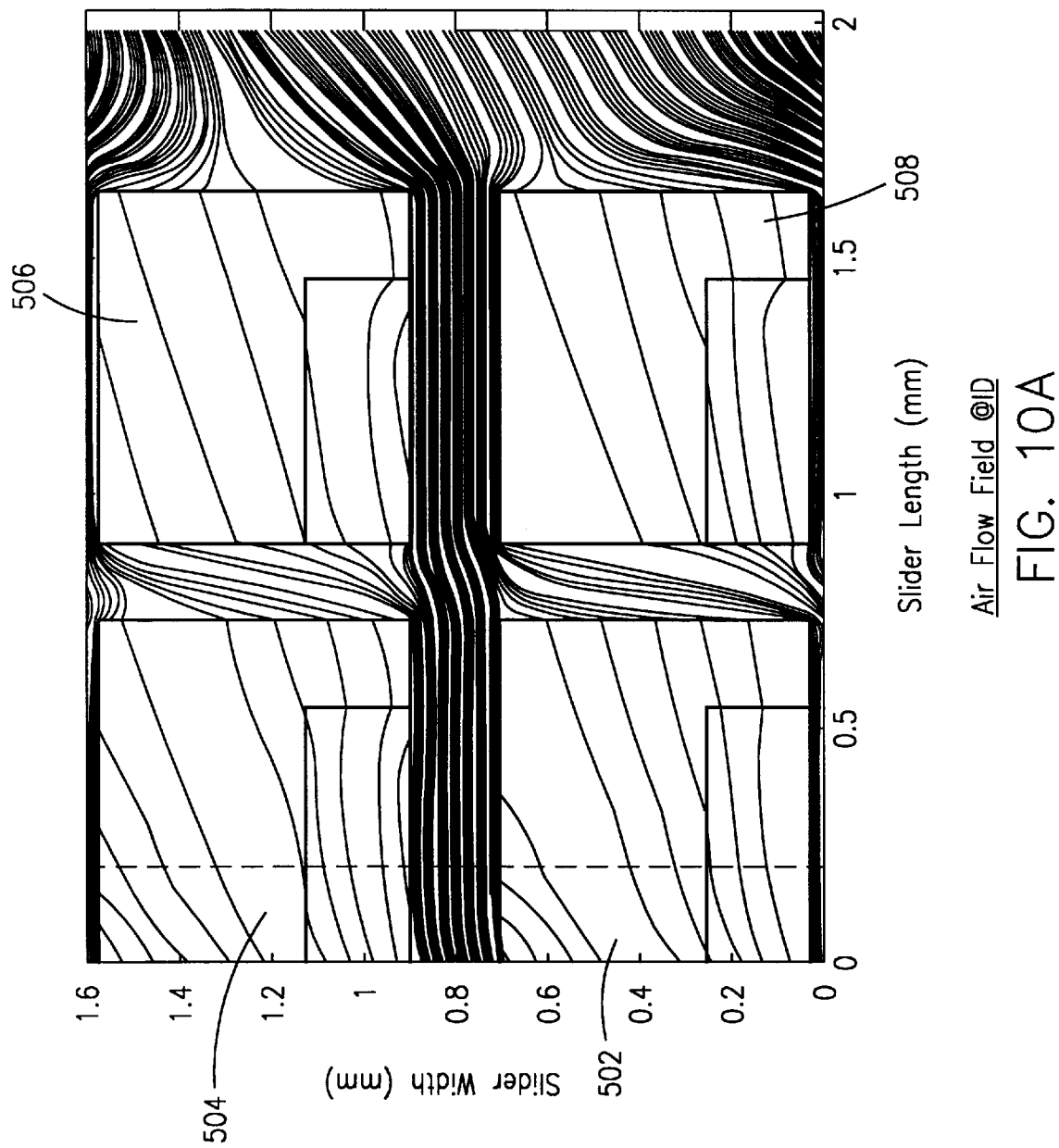
FIG. 10A and FIG. 10B show the air flow field over the slider and resulting 3D air bearing pressure profile at the inner diameter of the disc.
Figure 10B:
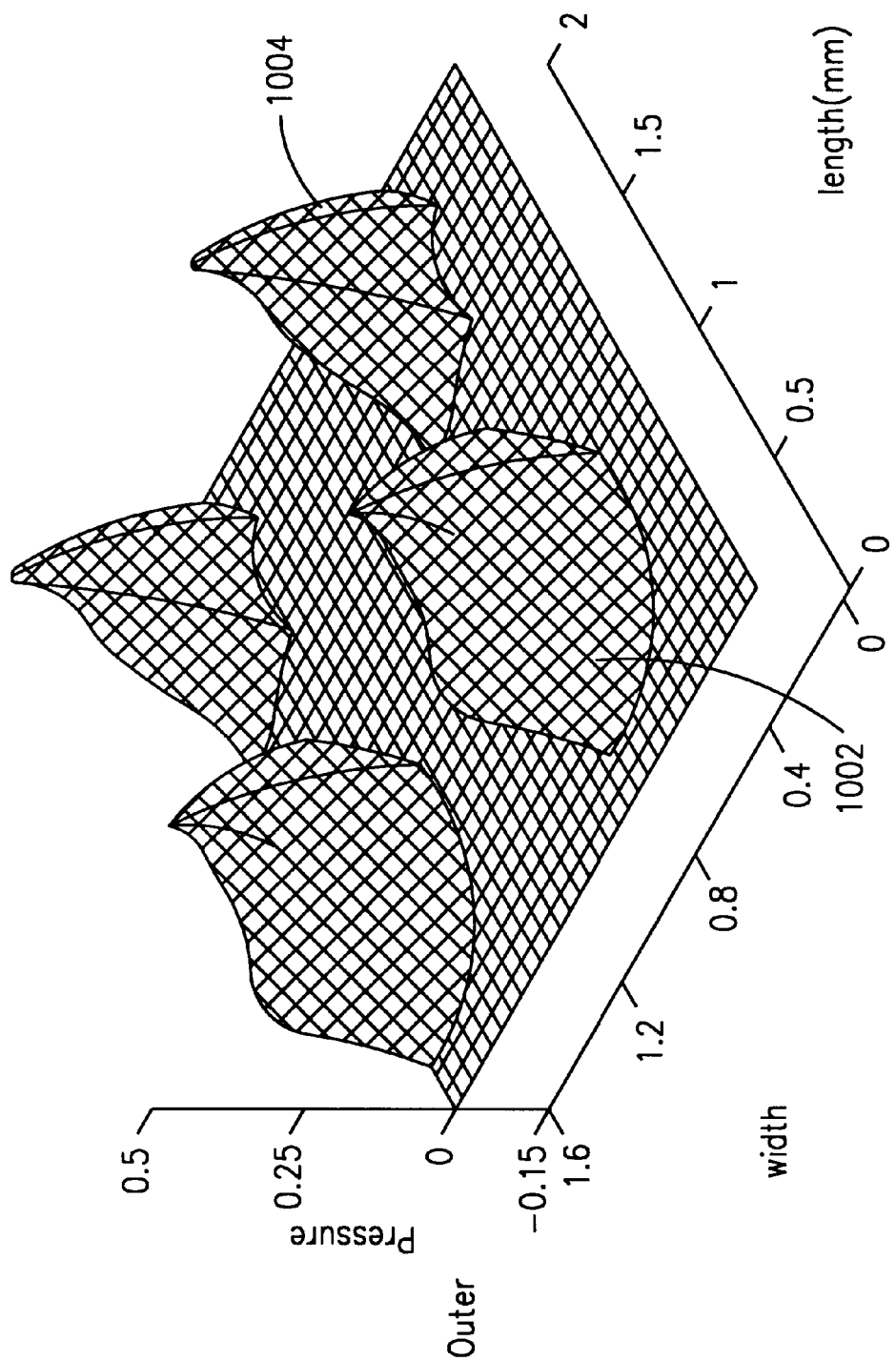
Figure 11A:
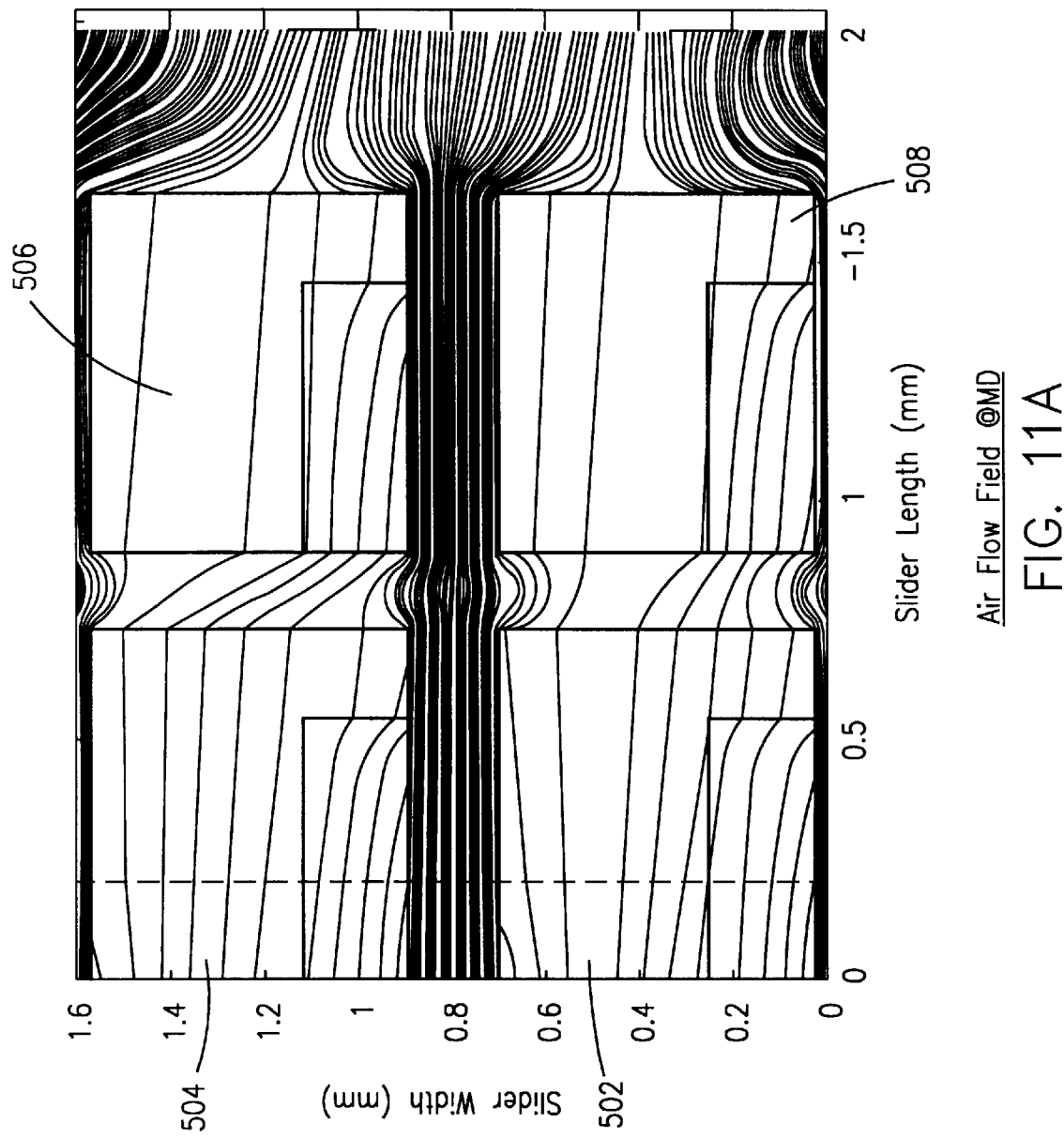
FIGS. 11A and 11B are corresponding illustrations for the slider at the middle diameter of the disc.
Figure 11B:
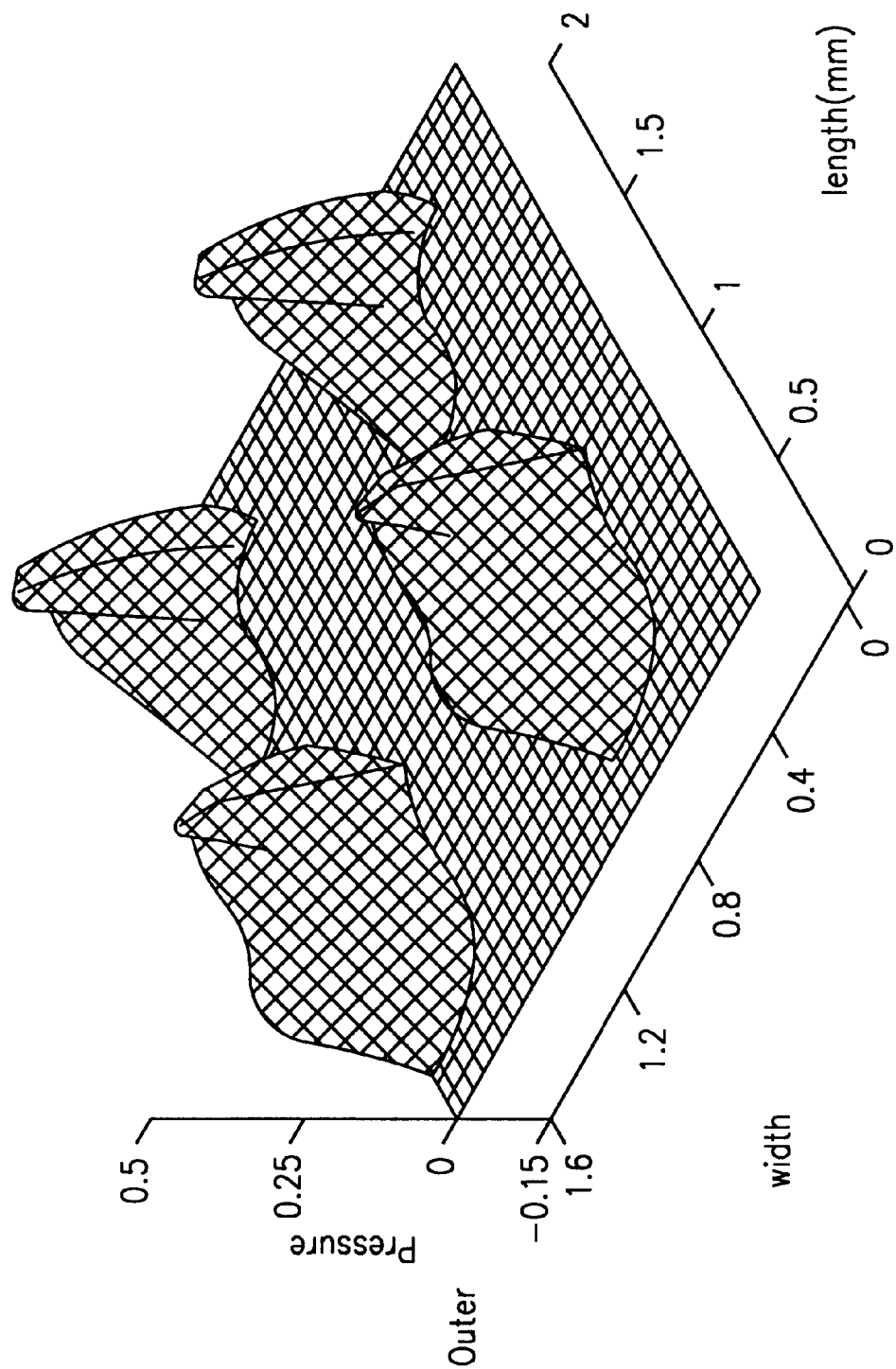
Figure 12A:
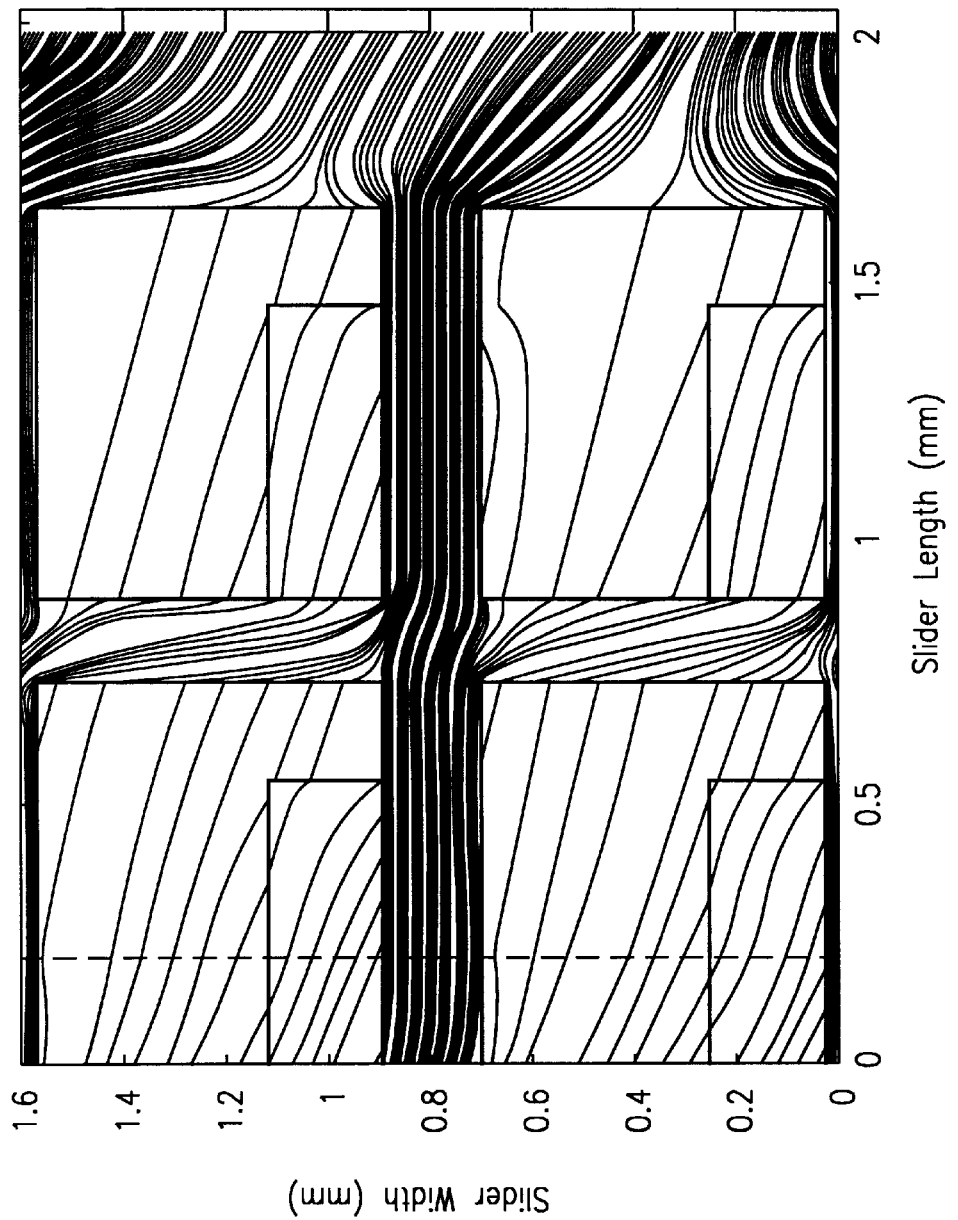
FIGS. 12A and 12B are corresponding illustrations for the slider at the outer diameter of the disc.
Figure 12B:
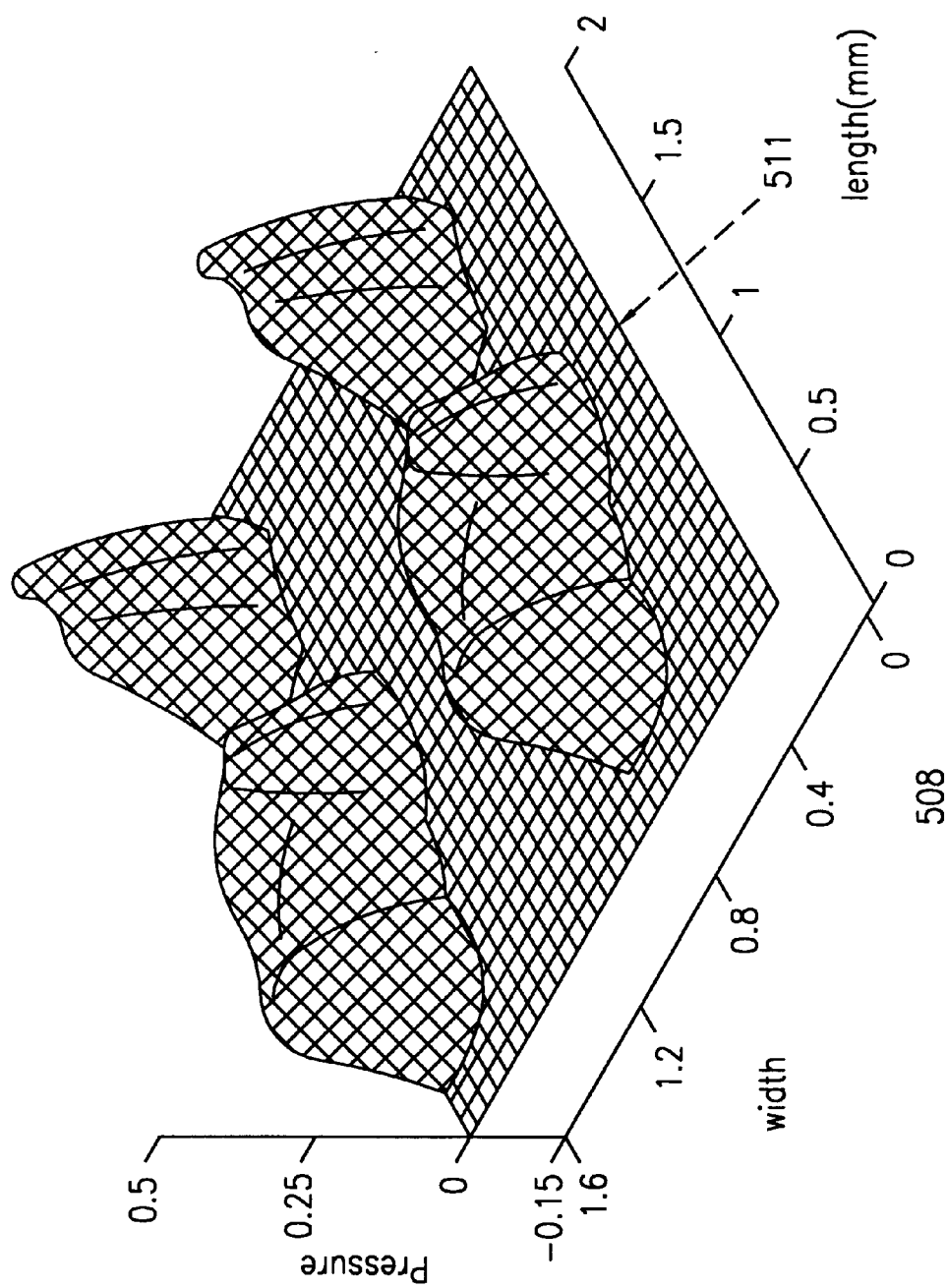

The next three sets of Figures are provided to illustrate the direction in which the air flows under the surface of pads and depressions, and the corresponding compression and suction which is achieved. Thus referring first to FIG. 10A and FIG. 10B, these represent measurements taken with the slider at the inner diameter of the disc. The line across the surfaces of the pads 502–508 represents the direction of the air flow; and corresponding chart in FIG. 5B has curved regions 1002 that indicate the suction generated at each pad and pointed regions 1004 that indicate the compression generated at the same location over the disc. Comparing these figures to FIGS. 11A and 11B, the lines across the pads 502–508 show the change in direction of the air flow. The companion FIG. 11B shows that while there is still little suction created, that the compression effects have diminished. Finally, referring to FIGS. 12A and 12B, it can be seen that the suction has been substantially enhanced as the slider has moved to the outer diameter, especially as compared to the suction created at the inner diameter. It is the combined effects of these phenomena that are effective in achieving a stable fly height profile across the entire surface of the disc.

Other features and advantages of the present invention and alterations to the preferred embodiment will become apparent to a person of skill in the art who studies the present invention disclosure. For example, by increasing the width of the depression or cavity 510, the compression effect would be enhanced, and the ID fly height increased while the suction at the outer diameter would be increased, decreasing the outer diameter fly height. Further, the cavity dimensions on different pads on the same slider could be different to achieve certain flight characteristics.

Therefore, the scope of the present invention is to be limited only by the following claims.

What is claimed is:

1. An air bearing slider configuration for supporting optical elements adjacent a rotating disc and supported on an actuator to selectively move the optical elements from an inner diameter to an outer diameter of said disc with a flat fly height profile over the surface of the disc, wherein the actuator supports said slider to have a substantially symmetrical skew angle with respect to air flow generated by rotation of said disc about a center track of said disc, the slider having a disc confronting surface comprising at least one slider pad, projecting from said surface, each said slider pad having a leading edge which is a first edge to contact said air flow generated by said disc, a trailing edge and an inner side which is more closely adjacent to said inner diameter of said disc and an outer side which is closer to said outer diameter track of said disc, each said slider pad having a primary air flow surface facing said disc for supporting said slider to fly over said surface of said disc, and each said slider pad further having a cavity in a corner of said pad and opening into a portion of said leading edge of said pad and said inner side of said pad and being generally rectangular in shape the bottom of the cavity ending above the main surface of the slider body.

2. A slider as claimed in claim I wherein said leading edge of said slider pad is tapered away from the leading edge of the disc toward said primary air flow surface of said slider pad, and said cavity is cut partially but not entirely into said tapered surface.

3. A slider as claimed in claim 1 wherein said slider comprises at least two of said slider pads positioned radially adjacent one another and spaced by a small gap to allow said cavity to be effective in creating suction and lifting forces.

4. A slider as claimed in claim 3 including at least four of said slider pads arranged with a first slider pad behind a second slider pad to effectively form inner and outer rails of a complete slider, with said first slider pad being longitudinally spaced from said second slider pad so that the cavity is effective in response to air flow over said pad surface in creating suction or lifting forces.

5. A cavity as claimed in claim 4 wherein said inner rail is spaced from said outer rail so that said cavity in each said pad is effective.

6. A slider as claimed in claim 1 wherein each said slider pad has a cavity with a radial width of about ⅓ the total width and length of about ¾ the total length of said pad.

7. A slider as claimed in claim 5 wherein said pads of said inner and outer rail are separated by about ⅓ to ¼ the total widths of said pad.

8. A slider as claimed in claim 2 wherein said cavity has a depth of about 1 μm.

9. A slider as claimed in claim 5 wherein each said leading edge of a slider pad is separated from said trailing edge of said slider pad by a gap of about ⅓ to ¼ the total length of said pad.

10. A slider as claimed in claim 1 wherein the length of said cavity is about twice as great as the width of said cavity.

11. An air bearing slider supported on an actuator to selectively move from an inner diameter to an outer diameter of said disc with a flat fly height profile over the surface of the disc, wherein the actuator supports said slider to have a substantially symmetrical skew angle with respect to air flow generated by rotation of said disc about a center track of said disc, the slider comprising four slider pads arranged projecting toward said disc, each of said slider pads having a leading edge which is a first edge to contact said air flow generated by said disc, a trailing edge and an inner side which is more closely adjacent to said inner diameter of said disc and an outer side which is closer to said outer diameter track of said disc, each of said slider pads having a primary air flow surface facing said disc for supporting said slider to fly over said surface of said disc, and said slider pads being divided into first and second longitudinally spaced sections, each of said slider pads having a rectangular recess in the primary air flow surface extending to the leading and the inner edge of the slider pad, the bottom of the cavity ending above the main surface of the slider body.

12. A slider as claimed in claim 11 wherein each of said first longitudinally spaced slider pad includes a tapered surface cavity cut partially but not entirely into said rectangular recess and extending from a leading surface of said pad toward the primary air flow surface.

13. A slider as claimed in claim 11 wherein each of said spaced sections comprises a first and second section.

14. A slider as claimed in claim 12 wherein said slider pad cavity is about ¾ of total length of said pad.

15. A slider having a disc confronting surface and including one or more rectangular pads projecting from said surface, each said pad having an open, substantially rectangular pocket or cavity located at and recessed into a leading and radially inner edge thereof, a bottom surface of the cavity ending above a main surface of the slider body.

16. A slider as claimed in claim 15 wherein said slider comprises 4 of said pads arranged in a generally rectangular scheme.

17. A slider as claimed in claim 16 wherein each of said cavities is open toward both of said inner and said leading edges.

* * * * *